MICHAEL GRASER, JR.
INVENTOR.

BY ALFRED H. ROSEN
AND JOHN H. COULT
ATTORNEYS

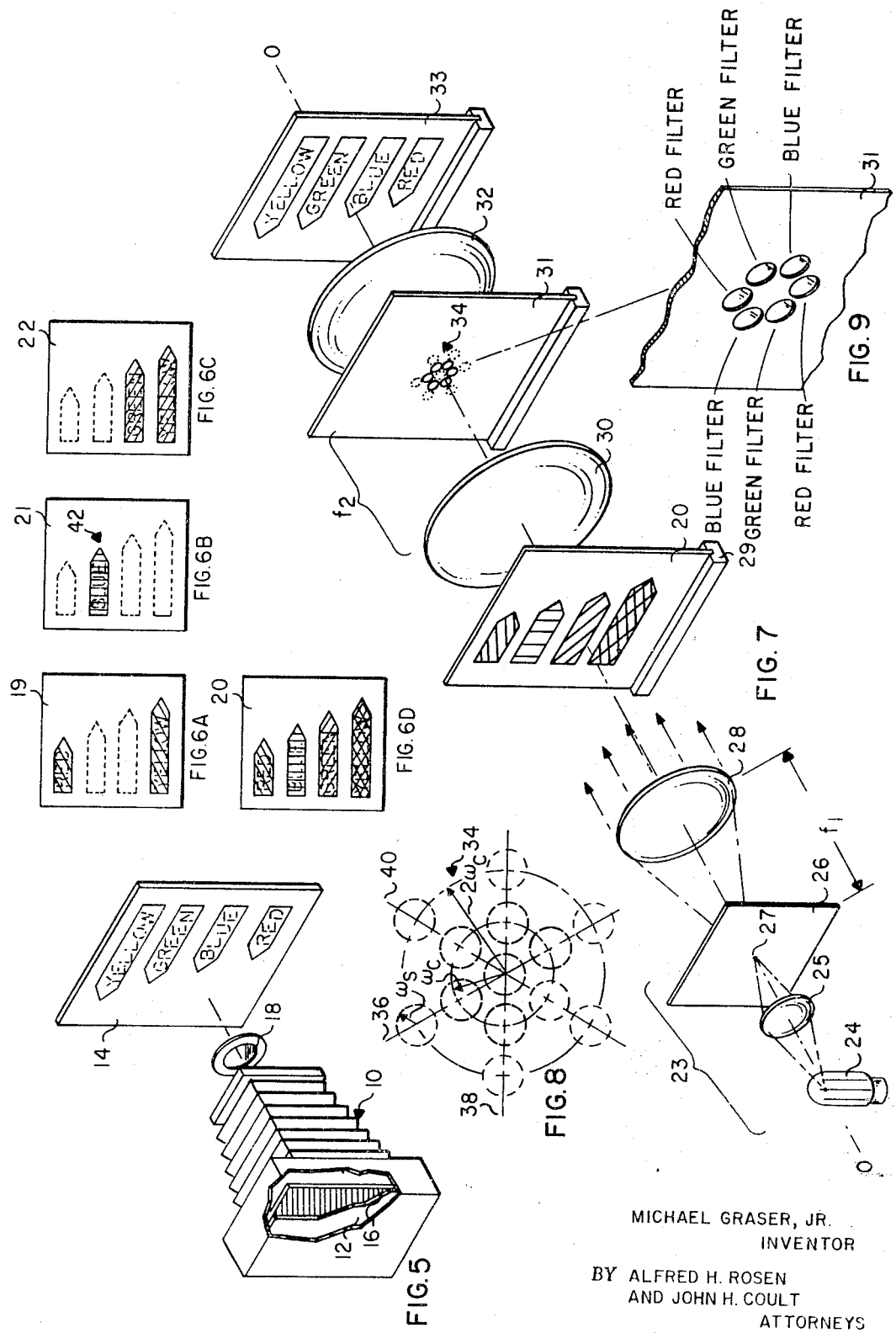

United States Patent Office 3,549,238
Patented Dec. 22, 1970

3,549,238
OPTICAL DISPLAY OR VIEWING SYSTEMS WITH COAXIAL DIFFRACTED AND NON-DIFFRACTED CHANNELS
Michael Graser, Jr., Bedford, Mass., assignor to Technical Operations, Incorporated, Burlington, Mass., a corporation of Delaware
Filed Feb. 14, 1968, Ser. No. 705,431
Int. Cl. G02b 27/38
U.S. Cl. 350—162
16 Claims

ABSTRACT OF THE DISCLOSURE

This disclosure depicts optical systems and methods especially for displaying or viewing color reconstructions from color separation information stored on a colorless record medium. Emphasis is placed upon novel light source means and methods for providing one or a substantial number of effective sources of substantially coherent radiation and/or a source of less coherent radiation. Novel techniques employing light source arrangements and spatial filtering are disclosed wherein the effective aperture requirements in the optical system employed are extremely modest.

CROSS-REFERENCE TO RELATED APPLICATION

This application is related to an application of Peter F. Mueller and Helmut Heckscher, Ser. No. 705,524, filed Feb. 14, 1968, assigned to the assignee of the present inventor.

BACKGROUND OF THE INVENTION

This invention concerns apparatus for viewing or displaying records having a plurality of color separation images recorded in additive superposition on a storage material, each of the images being multiplied with a spatial carrier of unique azimuthal orientation. The images are selectively recoverable, one or more at a time, by the use of diffraction phenomena and spatial filtering in a Fourier transform space. By the angular uniqueness of the carriers associated with each of the images, the respective diffraction patterns of the separate images are caused to be separated in the transform space. By appropriate spatial filtering in the transform space, a desired component record image or combination of component images may be selectively retrieved for viewing or display. The technique is extraordinarily adaptable to producing scene reproductions in natural or selectively distorted color from a colorless photographic record. For example, if a colored scene is photographed in succession through red, green, and blue spectral filters, and if while doing so, a spatially periodic function, e.g. a grating, is multiplied with each of the images at respectively different azimuthal orientations, three self-registered records will be formed, each being associated with a distinct spectral zone and modulation orientation. As described in detail below, by appropriate spatial filtering certain of the diffraction orders of the diffraction pattern formed with an apertured mask and by appropriate spectral filtering of the mask apertures to correlate the spectral content of the light passed by each of the mask apertures with the spectral zone associated with the color separation image passed by that aperture, a full-color reconstruction of the original scene may be obtained.

Techniques of spectral zonal photography have been known for some time. For example, in 1936 a technique involving associating distinct periodic modulations with separate color separation records and utilizing spatial filtering for image retrieval was explained in a patent issued in the United States to Bocca, Pat. No. 2,050,117 (later reissue Pat. No. Re. 20,748). It is significant to note that the concept of spectral zonal photography therein described has not been developed in spite of its early discovery and its considerable potential commercial value. Among the factors which hampered the development of this concept are thought to be the following. Random noise appearing in the displays as a result of random amplitude and/or phase perturbations of the coherent illuminating wavefronts degraded the reconstructions. The displayed (or viewed) images had only limited brightness. Each of these supposed limitations is a consequence of the necessity that the projection radiation have at least a predetermined minimum amount of coherence in order to achieve the necessary interference effects.

Further, by the sampling theorem, it is known that the carrier frequency governs the bandwidth of object spatial frequencies which may be transmitted through the system. In such prior art systems the limiting apeture of the system must be sufficiently large to pass at least the first diffraction order associated with each of the diffraction patterns produced. It follows, then, that the effective aperture of the system places a limitation on the maximum carrier frequency which may be used, and thus, on the resolution of the displayed or viewed images.

Systems have been devised which are capable of retrieving carrier modulated color separation images to form full color reconstructions, and yet which do not have the described aperture limitations. Patent No. 755,983, Wood, and an article by H. E. Ives appearing in the Aug. 3, 1906 issue of the British Journal of Photography, describe such systems. The Wood and Ives systems each utilize the phenomena that the diffraction angle of light is directly proportional to the spatial frequency of the illuminated object and the wavelength of the illuminating radiation. By carrier-frequency coding the scene colors and carefully calculating and controlling the carrier frequencies, object magnification and other relative parameters, the diffracted spatial frequency spectrum associated with each of the primary color separation images formed by light having a mean wavelength of the corresponding color are caused to overlap in a Fourier transform space. Thus, an aperture located at this point in the transform space acting as a spatial filter, will transmit the color separation spectra in the corresponding wavelength illumination which is necessary to view or display a full color reconstruction.

However, numerous drawbacks attend the use of such techniques. The very restricted bandwidth (relative to the carrier frequency used) of spatial frequencies which may be transmitted compels the use of extremely high frequency spatial carriers if reasonably high resolution reconstructions are to be produced. The coherence of the illuminating radiation produces random coherence noise effects in the reconstructed images. Further, the coherence requirements effectively place a constraint on the amount of energy which can be delivered to the record, and thus on the brightness of the reconstructions.

OBJECTS OF THE INVENTION

It is an object of this invention to provide apparatus and methods by which a selected one or any desired combination of superimposed, carrier-modulated component record images may be retrieved without the effective aperture of the embodied optical system imposing a significant constraint on either the resolution of the retrieved images or on the number of images which may be additively superimposed on the recording medium and then retrieved.

It is another object of the invention to provide an optical system and light source for displaying carrier-modulated imagery which is capable of producing displays of greater brightness, resolution, and signal-to-noise ratio than is possible using prior art techniques.

It is another object to provide means and methods enabling colorless carrier-modulated records to be viewed or displayed in full color and high resolution, or alternatively, in monochrome at even higher resolution.

It is still another object to provide for use with substantially coherent optical systems, one or a large number of effective point sources of high intensity visible radiation and/or a less coherent light source for use in combination therewith.

Further objects and advantages of the invention will in part be obvious and will in part become apparent as the following description proceeds.

The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 1A is a schematic view of a Fraunhofer diffraction pattern which might be produced by the FIG. 1 system;

FIG. 1B is a view of a sectored filter which may be used in the FIG. 1 system;

FIG. 3 is a top view of a section of the FIG. 2 apparatus in which a plurality of effective point light sources are generated;

FIG. 4 is a distorted scale schematic perspective view of yet another implementation of the inventive concepts;

FIG. 4A shows an alternative filter arrangement useful with the FIG. 4 embodiment;

FIG. 4B illustrates an alternative embodiment of the light generating apparatus shown in FIGS. 2 and 3 which is capable of producing twice as many effective point sources of relatively high intensity visible radiation as is the FIG. 3 arrangement;

FIGS. 5-9 are useful in illustrating the background of the present invention; FIG. 5 is a distorted scale schematic perspective view of a colored object and a photographic camera which might be used for forming carrier modulated color separation records of the object; the view shows the camera partially broken away to reveal photographic recording material and a diffraction grating which would be otherwise hidden within the interior of the camera;

FIGS. 6A-6D show individual and composite color separation records of the photographed object, each of the individual records being associated with a particular zone of the visible spectrum and with a periodic modulation distinctive by its relative angular orientation;

FIG. 7 is a distorted scale schematic perspective view of prior art projection display apparatus for displaying photographic records of the above-described type;

FIG. 8 is a schematic view of a Fraunhofer diffraction pattern which might be formed by the FIG. 7 apparatus; and FIG. 9 is a schematic perspective view, enlarged and broken away, of a spatial filter shown in FIG. 7.

DESCRIPTION OF THE PREFERRED EMBODIMENTS

Figure 1:
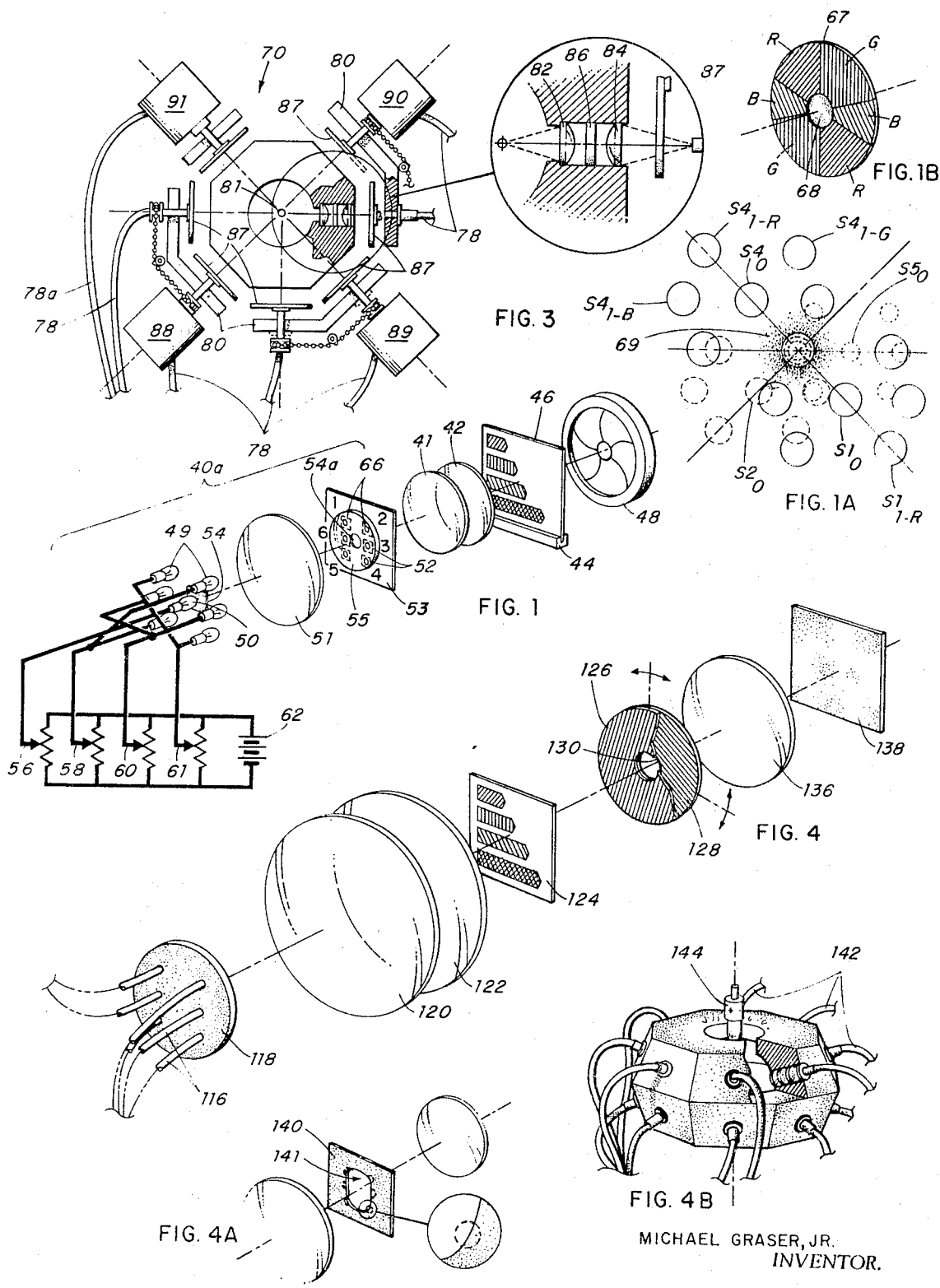
FIG. 1 is a distorted scale schematic perspective view of viewing apparatus which embodies the principles of this invention.

FIGS. 1-4 show various embodiments of the invention enabling the retrieval of one or a selected combination of superimposed carrier-modulated color separation record images. Before discussing these embodiments, however, in order to better understand the invention and its significance, a brief discussion of the general nature of the storage and recovery techniques with which this invention is involved, will be first engaged.

FIG. 5 shows in very schematic form a photographic camera 10 which might be employed to form a spectral zontal spatially periodically modulated photographic record. The record may be formed as a composite of three separate color separation exposures of a photosensitive film 12 in the camera 10. The separate color separation records thus formed are respectively associated with a spatial periodic modulation, imposed, for example, by a diffraction grating 16 adjacent the film 12, which is unique in terms of its relative azimuthal orientation.

FIG. 5 depicts the first step of a multi-step operation for forming such a composite record. An object 14 illustrated as having areas of predominantly yellow, green, blue, and red spectral reflectance characteristics, as labeled, is photographed through a filter 18 having a spectral transmittance peak in the red region of the visible spectrum. A grating 16 having a line orientation sloping, for example, at 30° to the horizontal, from upper right to lower left (as the grating would appear if viewed from the back of the camera), is juxta-posed with the film 12 to effect a superposition of a shadow image of the grating 16 on the red light image of object 14. The resulting color separation record 19 associated with the red content in the object 14, processed to a positive, for example, by reversal processing techniques, would appear as shown in FIG. 6A. It is seen from FIG. 6A that the grating modulation is superimposed upon the object detail associated with light having a red spectral content. Note that because of the red constituent of yellow light, the yellow area in the object 14 is also imaged with superimposed grating lines of like angular orientation.

To complete the formation of a composite photographic record, as shown in FIG. 6D at 20, color separation exposures are then made successively through a filter having a spectral transmittance characterized by a blue dominant wave-length with a diffraction grating oriented vertically, and then finally through a filter having a spectral transmittance dominant in the green region of the spectrum with a diffraction grating having a grating orientation sloping from the upper left to lower right, for example, at 30° to the horizontal.

It is seen from FIG. 6B that the blue color separation record 21 does not result in the exposure of any part of the film 12 not associated with blue content in the object 14; however, on exposure to the object 14 through a green filter, the yellow area is again exposed with grating image superimposed thereon with an orientation associated with the green color separation record 22. Thus, as shown in FIG. 6D, the object area having yellow spectral content has superimposed thereon spatially periodic modulations associated with both the red and green color separation records.

Apparatus for displaying such a photographic record is known to the prior art and many take the form shown in FIG. 7. Such display apparatus includes a source 23 of at least partially coherent light, illustrated as comprising an arc lamp 24, a condenser lens 25, and a mask 26 having an aperture 27 of restricted diameter. A lens 28 is provided for effectively transporting the point light source formed to a far field, either real or virtual. A film holder 29 for supporting a transparency record to be displayed, a transform lens 30 (explained below), a Fourier transform filter 31 (explained below), a projection lens 32, and a display screen 33 completes the display apparatus.

Upon illumination of a transparency record, such as composite record 20 in film holder 20, as a result of diffraction and interference phenomena and the relative angular displacement between the periodic modulations respectively associated with the color separation records 19, 21, and 22, three angularly displaced multi-order diffraction patterns, collectively designated by reference numeral 34, will be produced, as shown, for example, in the schematic illustration in FIG. 8. Each of the separate diffraction patterns associated with a separate color separation record comprises a zeroth order which is spatially coextensive with the zeroth order (undiffracted) components of each of the other patterns, and a plurality of higher order (diffracted) components representing a Dirac delta function array convolved with a spatial frequency spectrum characterizing the particular color separation record.

By the use of transform lens 30 these diffraction patterns are formed a focal length from the lens 30 in a space commonly known as the Fourier transform space. It is thus termed because of the spatial and temporal frequency analysis which is achieved in this space by the described diffraction and interference effects. Through the use of spatial and spectral filtering of these patterns in the transform plane, one or more of the discrete records may be displayed, for example, to achieve a reconstitution of the original scene in true or selectively distorted color.

The nature of the Fourier transform space and the effects that may be achieved by spatial filtering alone or by spatial and spectral filtering in this space of a selected diffraction order or orders may be understood by reference to FIG. 8. FIG. 8 shows three angularly separated diffraction patterns corresponding to the red, green, and blue light object spatial frequency spectra lying along axes labeled 36, 38, and 40 respectively. Each of the axes 36, 38, and 40 is oriented orthogonally to the periodic modulation on the associated color separation record. The diffraction patterns share a common zero order location but have spatially separated higher orders.

By the nature of diffraction phenomena, the diffraction angle $\alpha$ is:

$$\sin \alpha = \lambda \omega \qquad (1)$$

where $\lambda$ represents the spectral wavelength of the illumination radiation and $\omega$ represents spatial frequencies. Assuming the light at the film gate 29 to be collimated (although this is not a necessary condition) the diffraction orders will be formed in the transform space at the delta function positions determined by the transform of the record modulation at radial distances from the pattern axis:

$$R = f_2 m \omega_c \bar{\lambda} \qquad (2)$$

where $f_2$ is the focal length of lens 30; $\bar{\lambda}$ is the mean wavelength of the illuminating radiation; $m$ represents the diffraction order; and $\omega_c$ is the fundamental grating frequency.

The first orders of each of the diffraction patterns can be considered as being an object spatial frequency spectrum of maximum frequency $\omega_s$ (representing a radius of the order) convolved with a carrier of spatial frequency $\omega_c$. The second order components can be thought of as being the convolution of an object spectrum having a maximum spatial frequency $\omega_s$ with a carrier having a spatial frequency of $2\omega_c$, and so forth. Thus, the various orders of each diffraction pattern may be thought of as being harmonically related, with a spatial frequency $\omega_c$, or an even multiple thereof, acting as a carrier for the spectrum of spatial frequencies characterizing the object detail. Two orders only are shown; however, it should be understood that even higher orders are present, but will be of increasingly less intensity.

Spatial filtering of the diffraction pattern is achieved by placing the apertured transform filter 31 in the transform space, as shown in FIG. 7. Since the zeroth order components of the diffraction patterns are spatially coextensive, the spatial frequencies contained in the zeroth order information channel represents the sum of the spectra respectively associated with each of the color separation records 19, 21, and 22. Thus an opening in the transform filter 31 at the zeroth order location would result in a composite image of object 14 being formed in black, white, and tones of grey. Because the information channels associated with each of the color separation records are inseparably commingled in the zeroth order, they cannot be properly recolored to effect a faithful color reproduction of the photographed object. However, at the higher orders, because of the angular displacement of the red, blue, and green-associated axes 36, 38, and 40, the proper spectral characteristic may be added to each of the information channels by appropriate spectral filtering.

FIG. 9 represents an enlargement of a central portion of filter 31 illustrating appropriate spatial filtering apertures with the correct spectral filters to effect a true color reproduction of the object. It should be understood, of course, that higher order components, appropriately spectrally filtered, could also be passed, if desired. However, to maintain the discussion at a fundamental level, utilization of only the first order diffraction components has been illustrated.

Consider now a trace of the projection illumination as it traverses the projection system. The lamp 24 and condenser lens 25 are designed to evenly illuminate aperture 27 in mask 26 with a beam of maximum intensity broadband luminous energy. Lens 28 is shown spaced axially from mask 26 a distance substantially equal to its focal length in order that the light illuminating the film gate is substantially collimated. Transform lens 30 collects the substantially planar wavefronts in the zeroth order and diffracted higher orders and brings them to a focus in transform space in or near the aperture of the projection lens 32. The lenses 28 and 30 may be thus thought of as cooperating to image the illuminated aperture 27 in mask 26 on the transform filter 31. Lenses 30 and 32 image record 20 on screen 33.

As suggested above, prior art display and/or viewing systems, such as the one just described, are severly limited in their performance capabilities by the effective limiting aperture of the optical system employed. Utilizing an axial light source to provide the necessary coherent illumination of the carrier-modulated record has the well-known effect that the spectra respectively associated with the different component record images appears in the transform space at a radial distance from the optical axis which is a function of the mean wavelength of the illuminating radiation, the system magnification, and more importantly, the frequency of the spatial carrier. It is useful for a number of reasons, in optical storage and retrieval systems of the type described to maximize the spatial carrier frequency to which the component record images are modulated. An important reason is based on the sampling theorem which says, in effect, that the bandwidth of the spectrum of object spatial frequencies which may be transmitted upon a carrier is a direct function of the carrier frequency. For this reason alone, it is usually advantageous to maximize the spatial carrier frequency in order to achieve the optimum resolution of the reconstructed or viewed images.

Another important reason for wanting to use the highest possible modulation frequency concerns the fact that the spatial coherence requirements of the illuminating radiation (and thus the effective size of the source) decrease with increasing carrier frequency.

Further, it is proven to be difficult by prior art techniques to provide displays of satisfactory brightness. Utilizing a single effective point source of light derived, for example, from an arc lamp, to provide all the energy for the color information channels imposes great demands on the intensity of the effective point source. By this invention, a plurality of high intensity point sources of light are provided, all of which are derived from a single arc source.

The coherence noise, appearing as a speckling in the reconstructed images due to random perturbations of the coherent illuminating wavefronts, has been found to cause a severe degradation of the reconstructed images. One aspect of this invention is directed to overcoming this problem of image degradation due to coherence noise.

By this invention I provide methods and apparatus including a novel light source generator for producing a large number of effective point sources of relatively high intensity for providing the necessary coherent radiation, and a source of less coherent light for establishing an auxiliary wideband monochrome channel for improving the resolution, brightness, and signal-to-noise ratio of the retrieved images. Other advantages and improvements brought about by this invention will become apparent from the following description of a number of ways by which the inventive concepts may be implemented.

FIG. 1 schematically shows viewing apparatus embodying the invention. The FIG. 1 apparatus comprises light source means 40a for generating a plurality of light sources of restricted size (hereinafter termed effective point light sources, or merely point sources), a collimating lens 41, a transform lens 42, a film gate 44 for supporting a record 46, and an iris-type diaphragm 48 located in the Fourier transform space produced by the transform lens 42.

In more detail, the light source means 40a is shown as comprising six incandescent lamps 49 angularly spaced around the optical axis 0—0 in a generally hexagonal array, and an on-axis lamp 50. A condensing lens 51 images the incandescent lamps 49 upon an appropriately located array of apertures 52 of restricted size in mask 53. A diffusing and attenuating filter 54 illuminated by lamp 50 is imaged upon an axial opening 54a in mask 53 of substantially greater diameter than apertures 52. Thus, by this arrangement there is created an array of six effective point sources distributed around the optical axis 0—0 and a large diffuse source located on axis. A field lens 55 at the mask 53 minimizes light losses. For reasons which will become apparent hereinafter, the diametrically opposed pairs of the incandescent lamps 49 and lamp 50 are electrically connected to variable resistors 56, 58, 60, and 61, respectively, which are in turn connected in parallel across a battery 62. Adjustment of any one of the variable resistors 56, 58, 60, or 61 will thus cause the luminous energy output of the connected lamps to vary throughout a chosen luminance range, which range preferably includes zero to enable selected lamps to be energized to the exclusion of others.

The collimating and transform lenses 41 and 42 function to image the sources formed at the mask 53 in a space commonly termed the Fourier transform space at which the diaphragm 48 is located.

Assume the record 46 to be a composite color separation record substantially the same as the record 20 forming a part of the described FIG. 7 system but with the modulation vectors assuming a 0°–45°–135° configuration rather than the 0°–60°–120° geometry of the spatial carrier on the respective color separation images on the record 20. Illumination of the record 46 by the beam from each of the point light sources produces respective diffraction patterns of the record at the back focal plane of the lens 42. Each pattern is eccentrically located with respect to the optical axis, as shown in the enlarged schematic view (FIG. 1A) of the composite diffraction pattern, each pattern having a first harmonic diffraction order located on the optical axis. The light sources in each of the cooperating pairs of sources, because they are diametrically arranged, each cause a first harmonic diffraction order of the same color separation image to fall on the optical axis.

The azimuth on which each of the point sources (and source pairs) lie must be caused to be aligned with the azimuth of the direction vector of the component record image desired to be retrieved. There are many ways by which the necesary azimuthal correlation of light source and record carrier vector may be achieved. In the FIG. 1 embodiment, the angular geometry of the fixed light sources and the orientation of the record carrier vectors are interdependent. Accordingly, the pairs of apertures 52 and carrier vectors each have a 0°–45°–135° configuration.

Each of the effective point light sources created at the mask 53 has a predetermined radial spacing from the optical axis 0—0 which is carefully calculated such that the record-illuminating beam attributable to that point source has an effective angular displacement relative to the optical axis which is appropriate to locate a predetermined diffracted order upon the optical axis. Thus, as can be seen from Equation 2 above, consideration must be taken of the focal length of lens 42, the carrier frequency and the mean wavelength of the illuminating radiation.

It is evident from the above that the magnitude of the carrier frequency has no appreciable effect on the required size of the system aperture, but merely on the radial locations of the effective point sources.

Consider the effect of the wavelength of the illuminating radiation. It is necessary, of course, that if true color reconstructions of the original scene are to be viewed (or displayed), that each of the separately retrieved color separation images must be retrieved in light having a mean wavelength related to the characteristic color of that color separation record. To this end we provide red, blue, and green spectral filters 66 arranged in diametrically opposed pairs over the mask aperture pairs designated for retrieval of the like color separtion images. Alternatively, a sectored filter wheel 67 as shown in FIG. 1B might be provided in juxtaposition with the rear surface of the mask 53.

As seen from Equation 2, the greater the mean wavelength of the illuminating radiation, the greater the diffraction angle, and hence the greater must be the radial displacement from the axis of the associated light source. Accordingly, as shown in FIG. 1, the apertures 52 labeled 1 and 4, designated for retrieval of the red (long wavelength) color separation image from the record 46, are spaced a greater radial distance from the axis 0—0 than the apertures (labeled 2 and 5) associated with the green color sepration image which are in turn at a greater radial distance than the apertures (labeled 3 and 6) for retrieval of the blue color separation image.

Refer again to the illustration in FIG. 1A of the composite diffraction pattern formed in Fourier transform space. In order to keep the illustration as simple as possible, FIG. 1A shows only the diffraction patterns produced by the effective point sources 1 and 4 (the red sources), 2 (a green source), and 5 (a blue source). The fundamental (zero) order images of light sources 1, 2, 4, and 5 designated $S1_0$, $S2_0$, $S4_0$, and $S5_0$, respectively, are shown distributed about the pattern center located on the optical axis 0—0, each image having a radial location proportionl to the mean wavelength of the radition producing that image. Thus, $S4_0$, a red source image, is spaced farther from the axis than $S2_0$, a green source image. Certain of the non-zero diffraction orders are labeled to illustrate the composition of the total pattern. For example, first diffraction orders produced by source 4 and characterizing red, blue, and green color separation spectra are designated $S4_{1-R}$, $S4_{1-B}$, and $S4_{1-G}$, respectively. FIG. 1A clearly shows first diffraction order spectra of each of the three color separation images on record 46 overlapped on the system axis. FIG. 1A further illustrates how the use of diametrically opposed pairs of sources doubles the effect of a single set of sources to cause a two-fold increase in the intensity of each of the retrieved color separation images.

It is evident from FIGS. 1 and 1A and from the above discussion that the diaphragm 48 effectively acts as an adjustable spatial filter, transmitting one of the first harmonic diffraction orders associated with each of the point sources while excluding all of the unwanted diffracted orders.

By adjusting the resistors 56, 58, and/or 60 to the zero voltage positions, a selected one or combination of light source pairs may be energized—thus, one or a selected combination of the color separation images stored on the record 46 may be retrieved in any desired intensity apportionment. By viewing the record through the diaphragm 48, a reconstruction in natural or selectively distorted color may thus be seen.

In accordance with one aspect of this invention, lamp 50 illuminating diffuser 54 provides a relatively large source of diffuse light for producing a light beam which is less coherent at the record 46 than the beams produced by lamps 49. This source, in combination with opening 54a in mask 53 creates an auxiliary monochrome channel for producing a low noise, high resolution monochrome reconstruction superimposed upon the highly saturated color reconstruction formed by the substantially coherent channels. Because the source in this auxiliary channel is caused in a preferred embodiment to be large and diffuse, the image 69 (see FIG. 1A) thereof produced by lenses 41 and 42 at the Fourier transform plane at the location of the opening in diaphragm 48, is substantially less coherent than the coherent channels and thus the described speckling (coherence noise) effects in the reconstructed images are not produced. Although the color saturation of the composite reconstruction is decreased by the addition of the monochrome reconstruction, the enhanced resolution, brightness, and signal-to-noise ratio of the composite reconstruction produces a marked improvement in the fidelity of the reconstructed images.

As an alternative to using a diffusing filter 54 in front of the lamp 50, an embodiment employing the sectored filter wheel 67 shown in FIG. 1B might have a neutral density diffusing central portion 68 for producing a phase randomness of the illuminating wavefronts in the auxiliary channel.

It is important to note that this auxiliary channel has been added to bring about the described improvements in the displayed (or viewed) images without appreciably effecting the aperture requirements of the optical system employed. The auxiliary channel, being located on the optical axis 0—0, coincides in Fourier transform space with the first order color channels overlapped on axis, and thus is also transmitted by the diaphragm aperture.

Figure 2:
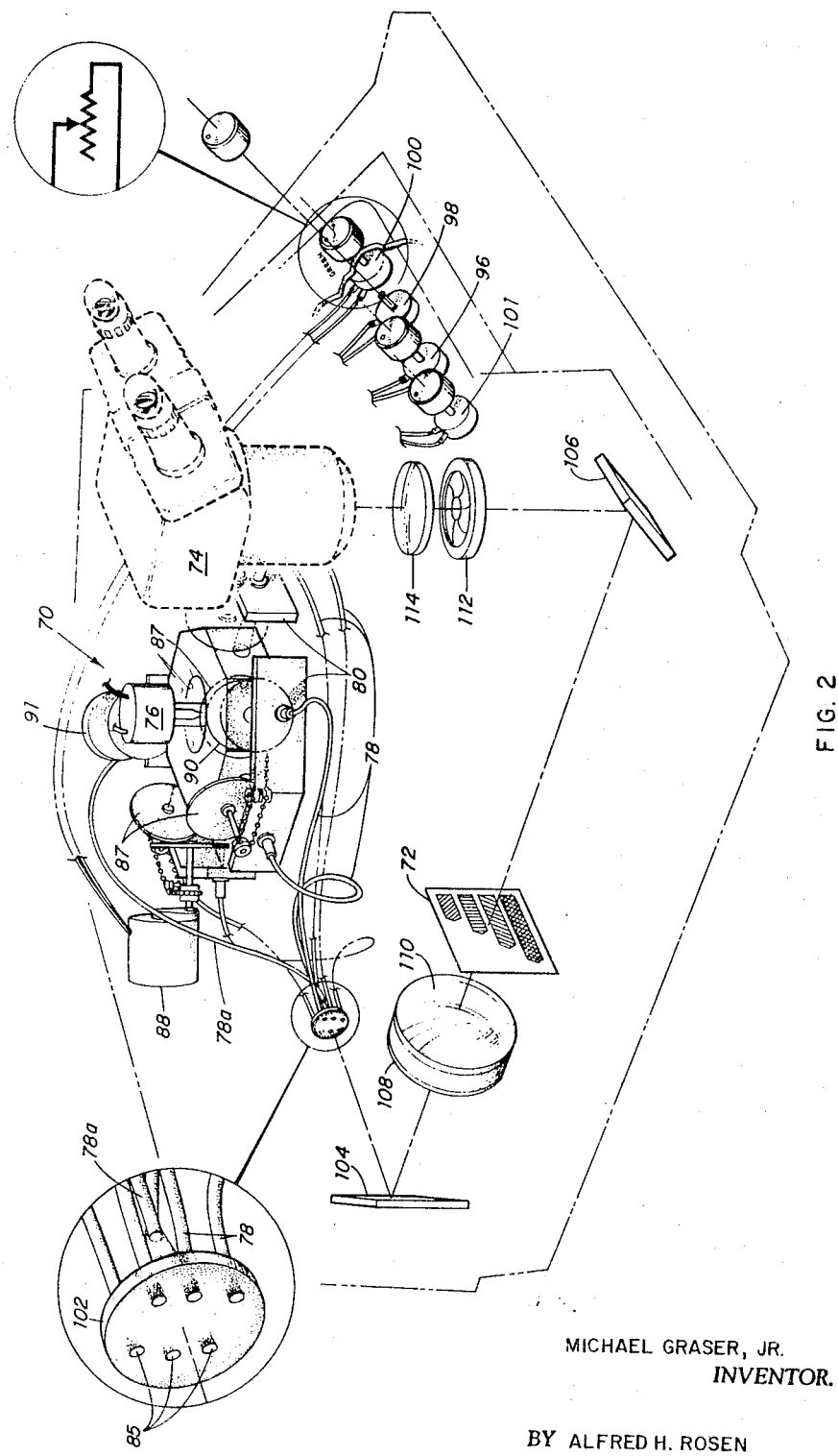
FIG. 2 is a perspective view showing a preferred embodiment of viewing apparatus implementing the inventive concepts.

FIG. 2 shows an embodiment of the invention which is quite similar in concept to the FIG. 1 embodiment, but which is intended to illustrate a more practicable structure. FIG. 2 illustrates binocular viewing apparatus comprising a novel light generating module 70, an optical detection system for selectively retrieving carrier modulated component images from a composite record 72, and a binocular viewer 74 for viewing images retrieved by the detection system.

The light generating module 70 illustrates an implementation of one aspect of my invention and comprises an arrangement for producing a plurality of intense effective point sources of substantially coherent radiation. The module 70 includes a high intensity xenon arc lamp 76 which is surrounded by an octagonally arranged array of light transmitting optical fibers 78. The illustrated module 70 is capable of producing eight effective point sources; however, only seven are shown in this particular embodiment. Referring to FIG. 3 together with FIG. 2, the ends of the optical fibers 78 are supported in a plurality of mounting plates 80 with their input ends each addressing the arc 81 produced by lamp 76 through an intermediate optical system comprising condensing lens elements 82 and 84 which serve to image the lamp arm 81 into the exposed end of the registered optical fiber.

In order that the light transmitted by each of the fibers have a particular mean wavelength, a spectral filter 86 is included in each of six of the collimated beams between lens elements 82 and 84. One fiber (labeled 78a) is used to produce a large diffuse source of incoherent white light, as explained below, and thus is not spectrally filtered. Whereas only one of the sets of lens elements 82 and 84 are illustrated, it should, of course, be understood that a like set of elements is provided for imaging the arc into the input end of each of the seven optical fibers employed.

By an appropriate disposition of spectral filters 86 having mean wavelengths in the red, blue, and green regions of the visible spectrum, the output ends 85 of six of the optical fibers 78 are caused to emanate red, blue, and green light in three sets of diametrically opposed pairs.

As discussed with respect to the FIG. 1 embodiment, it is desirable to be able to adjust the relative intensity of the individual light sources and thus of the retrieved images. To this end, there are provided seven continuously varying neutral density filters 87 mounted for rotation through the respective inputs to the optical fibers 78 and fiber 78a. In order that these filters 87 may be adjusted from a remote position, a plurality of D.C. stepping-type motors 88, 89, 90, and 91 are provided. The optical fibers 78 are arranged such that cooperating pairs of fibers which are diametrically arranged at the input to the optical detection system (at the output of the fibers) are caused to be adjacent in the module 70 to facilitate intensity control by a common motor. Three manually operable potentiometers 96, 98, and 100, mounted on the operator's panel, provide means for controlling the motors 88, 89, and 90, and thus the relative intensity of the retrieved color separation images. A potentiometer 101 is provided for controlling motor 91 and thus the light intensity at the output of fiber 78a.

The optical detection system illustrated is very similar to the system shown in FIG. 1, and includes three pairs of diametrically located point sources of partially coherent radiation arranged in a 0°–45°–135° configuration corresponding to the angular geometry of the direction vectors of the spatial carriers on the record 72. The point sources are formed by mounting the ends of the optical fibers 78 in a mounting element, which may, for example, be a Plexiglas disk 102. "Plexiglas" is a registered trademark of the Rohn and Haas Company.

As intimated above, in accordance with this invention, an arbitrarily selected one of the optical fibers 78, here labeled 78a, is used to produce a source of light which has less coherence at the record 72. To this end, the front surface of the Plexiglas disk 102 is frosted, or otherwise caused to effect random phase deviations of illuminating wavefronts. The output end of fiber 78a is supported as shown in the fragmentary blow-up view associated with FIG. 2, on the axis of the disk 102 at a spacing from the disk determined by the convergence angle of the input (and thus the divergence angle of the output), into the optical fiber 78a.

By this arrangement, the relatively high intensity radiation emanating from the output end of fiber 78a brightly illuminates the frosted surface of the disk 102 to produce a large source of diffuse light for establishing an auxiliary monochrome channel, as described above with respect to the FIG. 1 embodiment.

The optical detection system includes a pair of mirrors 104 and 106 for compacting the system light path. A collimating lens 108 and a transform lens 110 function, as in the FIG. 1 embodiment, to form a composite diffraction pattern of the record (see FIG. 1A) on a diaphragm 112. As described with reference to the FIG. 1 embodiment, the first diffraction orders associated with each of the color separation records and/or the less coherent source image will be transmitted through the diaphragm aperture when the appropriate effective point sources are energized. A lens 114 functions to image the record 72 within the binocular viewer 74 for magnification by the viewer optics.

In the manner described above during the discussion of the FIG. 1 embodiment, an auxiliary channel is established by the illumination of the disk 102 at the output from fiber 78a to less coherently illuminate the record 72 to provide a low noise, high fidelity monochrome reconstruction of the record for improvement of the highly saturated but noise-degraded images produced by the more coherent color channels.

FIG. 4 shows another embodiment of the inventive concepts wherein the resolution and brightness of retrieved color reconstruction images are improved by passing a predetermined, selectively variable amount of the zeroth order (D.C.) energy associated with each of three pairs of diametrically related point sources of spatially coherent radiation. In more details, the FIG. 4 embodiment is illustrated as comprising three diametrically arranged pairs of optical fibers 116, as for example, might be derived from a light generating source such as module 70 in the FIGS. 1 and 2 embodiment. The output end of each of fibers 116 is anchored in a Plexiglas disk 118 at a predetermined radial distance from the optical axis 0—0 which a function of the mean wavelength of the transmitted radiation, as described above in connection with the FIGS. 1 and 2 structure. A collimating lens 120 and a transform lens 122 provide six angularly displaced beams illuminating monochrome record 124 with substantially coherent light.

A pair of annular polarizing filters 126 and 128 having crossed axes of maximum transmittance are located at the Fourier transform plane formed by lenses 120 and 122 to provide a dual function. The filters 126, 128 define an axial opening 130 acting as a spatial filter. The opening 130 has a diameter sufficient to pass without attenuation a first diffraction order associated with each of the point sources created at the output of fibers 116. In addition to this function, the polarizing filters 126 and 128 pass a predetermined fraction of the zeroth order energy associated with each of the effective point sources, and thus transmit a wideband spectrum of spatial frequencies characterizing the monochrome record to substantially enhance the resolution and brightness of the color reconstructions produced. The fraction of the zeroth order energy which it is desired to transmit through Fourier transform space is easily controlled by adjustment of the relative angular position of the polarizing filters 126 and 128. As an alternative to viewing the retrieved information, a projection lens 136 is shown for displaying retrieved images on a screen 138.

Whereas crossed polarizing filters have been shown as a way of controlling the amount of zeroth order energy transmitted through transform space and thus the intensity of the monochrome reconstruction, many other ways are contemplated for accomplishing the said control of the amount of the zeroth order energy transmitted. One alternative arrangement is shown on FIG. 4A. FIG. 4A depicts a transform filter 140 having a relatively large opening 141, the boundary definition of which is carefully designed so as to transmit the same fraction of the zeroth order energy associated with each of the effective point sources. The irregular shape of the opening is due, of course, to the radial displacements of the sources from the axis 0—0 being a function of the means wavelength of the radiation produced (after spectral filtering).

FIGS. 2 and 3 depict a novel light source arrangement using a single arc lamp and a radial array of optical fibers for producing up to eight (with the illustrated octagonal geometry) sources. However, even in this relatively efficient arrangement wherein light is collected in a space gridling the arc lamp 76, a considerable fraction of the total luminous energy output from the arc lamp 76 is wasted. FIG. 4B shows a novel arrangement employing the techniques illustrated in the light source module 70 to provide twice as many effective sources as is provided by the module 70. The FIG. 4B embodiment exploits the fact that conventional arc lamps have a 360° radiation pattern with a generally fan-shaped cross section. The FIG. 4B embodiment comprises a double octagonal array of circumferentially spaced optical fibers 142, the arrays being axially spaced but having a common center at the arc of lamp 144. The resulting configuration roughly resembles a pair of cones arranged base-to-base.

A cone of radiation from the arc is collected by each of sixteen condensing lens assemblies which respectively focus the collected light into the input ends of each of the fibers 142.

It is manifest that the FIG. 4B module could be provided with spectral and attenuating filters, as in the FIG. 2 and FIG. 3 embodiment; however, in the interest of simplicity, such auxiliary structures have been omitted. It is also evident that arrays having other than an octagonal geometry might be employed, depending upon the number of light sources desired. For example, hexagonal, septagonal, or other geometries might be employed.

My invention is not related to the particular details of construction of the embodiments depicted and it is contemplated that various and other modifications will occur to those skilled in the art. Certain other changes may be made in the above-described embodiments without departing from the true spirit and scope of the invention and it is therefore intended that the subject matter of the above depiction may be interpreted as illustrative and not in a limiting sense.

What is claimed is:

1. In optical viewing or display apparatus, the combination comprising:

record support means for supporting a record which includes an image modulating a spatial carrier;

light source means including a first source for illuminating the record with a first beam of light having substantial coherence at said record support means and a second source for illuminating a record with a second beam of light which is less coherent at said support means;

lens means for forming in a Fourier transform space a diffraction pattern of the record comprising a Dirac delta function array convolved with a spectrum of spatial frequencies characterizing said record image, said lens means also forming an image of said second source;

means for supporting said first source in azimuthal alignment with the vectorial direction of said carrier and at an angle with respect to said second beam which is appropriate to locate a predetermined diffracted order of the diffraction pattern of said record in overlapping relationship with said image of said second source; and spatial filter means disposed in said transform space and defining an opening located to selectively pass at least a portion of the overlapped spectra associated with said first and second sources.

2. In optical viewing or display apparatus having an optical axis, the combination comprising:

record support means for supporting on said axis a record which includes an image modulating a spatial carrier;

light source means including a first source for illuminating the record with a first beam of light angled obliquely to said axis and having substantial coherence at said record support means, said light source means including an axial second source for illuminating the record with a second light beam which is less coherent at said support means;

lens means for forming in a Fourier transform space a diffraction pattern of the record comprising a Dirac delta function array convolved with a spectrum of spatial frequencies characterizing said record image and an image of said second source;

means for supporting said first light source in azimuthal alignment with the vectorial direction of said carrier and at an angle with respect to said axis which is appropriate to locate a predetermined diffracted order of said diffraction pattern on said axis; and spatial filter means disposed in said transform space and defining an opening located on said axis to selectively pass at least a portion of each of said predetermined diffracted order and the image of said second source.

3. The apparatus defined by claim 2 wherein said light source means for providing said first source comprises an optical fiber having an input end and having an output end which acts as said first light source, and means for effecting a concentration of luminous energy at said input end of said optical fiber.

4. The apparatus defined by claim 2 wherein said light source means for providing said second source comprises an optical fiber having an input end and an output end, means for effecting a concentration of luminous energy at said input end of said optical fiber, and a light diffusing element disposed to address said output end of said fiber at a distance therefrom for receiving radiation from said output end.

5. In optical viewing or display apparatus having an optical axis, the combination comprising:

record support means for supporting on said axis a record which includes a plurality of color separation images respectively multiplied with a spatial carrier, the direction vectors of said carriers having a predetermined angular separation;

light source means including a predetermined plural number of off-axis substantially coherent sources for illuminating the record with a like plural number of light beams each angled obliquely to said axis and having substantial coherence at said record support means, said light source means including a less coherent source on said axis for illuminating the record with a beam of light of less coherence at said record support means;

lens means for forming in a Fourier transform space a like number of diffraction patterns of the record, each comprising a corresponding plurality of Dirac delta function arrays having an angular separation related to said predetermined angular separation of said carrier direction vectors, each delta function array being convolved with a spectrum of spatial frequencies characterizing a different one of the component record images, said lens means also forming an image of said less coherent source in said transform space;

means for supporting in azimuthal alignment said coherent light sources and the carrier vectors of said component record images;

means for effecting an angulation of each of said beams with respect to said axis which is appropriate to locate a predetermined harmonic diffraction spectrum of each of said component images on said axis; and spatial filter means disposed in said transformer space and defining an opening located on said axis to selectively pass said predetermined diffracted orders and the said image of said less coherent source.

6. The apparatus defined by claim 5 wherein said light source means for providing said plurality of sources of coherent light comprises a corresponding plurality of optical fibers having respective input ends and having respective output ends acting as said sources of coherent light, and means for effecting a concentration of luminous energy at the respective input ends of said optical fibers.

7. The apparatus defined by claim 6 wherein said means for effecting said concentration of luminous energy comprises an arc lamp for generating a high intensity electric arc and lens means for imaging said arc into said input end of said filter.

8. The apparatus defined by claim 5 wherein said light source means for providing said source of less coherent light comprises an optical fiber having an input end and an output end, means for effecting a concentration of luminous energy at said input end of said fiber, and a light diffusing element disposed to address said output end of said fiber at a distance therefrom for receiving radiation from said output end.

9. The apparatus defined by claim 5 including means for varying the relative intensity of said plurality of sources of coherent light.

10. The apparatus defined by claim 9 including means for adjusting the intensity of said source of less coherent light relative to the intensities of said plurality of sources of coherent light.

11. The apparatus defined by claim 10 wherein said means for adjusting the intensity of said plurality of sources of coherent light is capable of extinguishing said sources, said apparatus including means for varying the effective size of said opening in said spatial filter means, whereby a wideband monochrome image may be viewed in preference to a colored reconstruction.

12. A method for viewing or displaying an image stored on a record in multiplication with a spatial carrier comprising:

illuminating the record with a first beam of light having substantial coherence at the record;

illuminating the record with a second beam of light which is less coherent at the record;

forming in a Fourier transform space a diffraction pattern of the record comprising a Dirac delta function array convolved with a spectrum of spatial frequencies characterizing the record image;

forming in said Fourier transform space an image of the source of said second beam;

effecting an angulation of said first beam with respect to said second beam which is appropriate to locate a predetermined diffracted order of the diffraction pattern of said record image in overlapping relationship with the said image of the source of said second beam; and selectively passing through said transformer space at least a portion of the overlapped spectra associated with said first and second beams.

13. In optical viewing or display apparatus having an optical axis, the combination comprising:

a record gate for supporting on said axis a record which includes a plurality of superimposed component record images each modulating a spatial carrier, the direction vectors of said carriers having a predetermined angular separation;

light source means for illuminating the record with light beams effectively emanating from a corresponding plurality of angularly separated sources, each of said beams being angled obliquely to said axis and having substantial coherence at said record gate;

lens means for forming in a Fourier transform space a corresponding plurality of diffraction patterns of the record, each comprising a corresponding plurality of Dirac delta function arrays having an angular separation related to said predetermined angular separation of said carrier direction vectors, each delta function array being convolved with a spectrum of spatial frequencies characterizing a different one of the component record images;

means for supporting in azimuthal alignment said light sources and the carrier vectors of said component record images;

means for effecting an angulation of each of said beams with respect to said axis which is appropriate to locate a predetermined harmonic diffraction spectrum of each of said component images on said axis;

spatial filter means disposed in said transform space and including:

mask means defining an opening located on said axis to selectively pass said predetermined diffraction spectra of each of said component images, and partially transmitting filter means at the locations of the zeroth harmonic orders of the diffraction patterns respectively associated with said plurality of sources for admitting through said transform space a predetermined fraction of the zeroth order energy produced by said sources.

14. The appaartus defined by claim 13 wherein said filter means is adjustable to vary the said predetermined fraction of said zeroth order energy transmitted through said transform space.

15. The apparatus defined by claim 14 wherein said variable filter means comprises a pair of annular polarizing filters centered on said optical axis and having crossed planes of maximum transmission, said apparatus including means for adjusting the relative angular position of said polarizing filters to vary the transmission therethrough.

16. The apparatus defined by claim 14 wherein said filter means includes light transmissive areas on said mask means for transmitting a selected portion of each of said zeroth order images of said light sources to effect a transmission through said transform space of the said predetermined fraction of said zeroth order enregy.

References Cited

UNITED STATES PATENTS

| | | | |
|---|---|---|---|
| 2,995,067 | 8/1961 | Glenn Jr. | 350—162JFUX |
| 3,108,383 | 10/1963 | Gabor | 350—162X |
| 3,425,770 | 2/1969 | Mueller et al. | 350—162 |

JOHN K. CORBIN, Primary Examiner

U.S. Cl. X.R.

350—35, 96, 147; 353—20, 85, 97